US006511399B2

(12) United States Patent
Mc Collum Etchason et al.

(10) Patent No.: US 6,511,399 B2
(45) Date of Patent: Jan. 28, 2003

(54) TORQUE AND POWER CONTROL IN A POWERTRAIN

(75) Inventors: Edmond Mc Collum Etchason, New Palestine, IN (US); John P Kresse, Martinsville, IN (US); Gregory A Hubbard, Carmel, IN (US); Timothy Alan Robinson, Avon, IN (US); Jeffrey Kurt Runde, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/841,123

(22) Filed: Apr. 25, 2001

(65) Prior Publication Data

US 2002/0183163 A1 Dec. 5, 2002

(51) Int. Cl.[7] ........................ F16H 59/14; F16H 59/74; F16H 59/36

(52) U.S. Cl. ........................ 477/107; 477/110; 477/111

(58) Field of Search ................................ 477/107, 110, 477/111; 701/110

(56) References Cited

U.S. PATENT DOCUMENTS

| | | | | | |
|---|---|---|---|---|---|
| 4,070,927 | A | | 1/1978 | Polak | 74/765 |
| 4,685,548 | A | * | 8/1987 | Holtermann et al. | 192/3.31 |
| 5,072,631 | A | * | 12/1991 | Fujimoto et al. | 477/107 |
| 5,109,696 | A | * | 5/1992 | Bright et al. | 72/112 |
| 5,186,081 | A | * | 2/1993 | Richardson et al. | 123/383 |
| 5,325,740 | A | * | 7/1994 | Zhang et al. | 477/102 |
| 5,562,570 | A | * | 10/1996 | Nakashima | 477/127 |
| 5,667,458 | A | * | 9/1997 | Narita et al. | 477/118 |
| 5,738,606 | A | * | 4/1998 | Bellinger | 477/111 |
| 5,832,387 | A | * | 11/1998 | Bae et al. | 455/522 |
| 5,833,570 | A | * | 11/1998 | Tabata et al. | 477/3 |
| 5,989,154 | A | * | 11/1999 | Christensen et al. | 477/111 |
| 6,067,495 | A | * | 5/2000 | Fliearman et al. | 477/108 |
| 6,155,955 | A | * | 12/2000 | Boss et al. | 123/339.11 |
| 6,165,102 | A | * | 12/2000 | Bellinger | 477/168 |
| 6,243,637 | B1 | * | 6/2001 | Minowa et al. | 477/31 |
| 6,266,597 | B1 | * | 7/2001 | Russell et al. | 477/107 |

* cited by examiner

*Primary Examiner*—Charles A. Marmor
*Assistant Examiner*—Eric M. Williams
(74) *Attorney, Agent, or Firm*—Leslie C. Hodges

(57) ABSTRACT

A powertrain having a controller for limiting the torque and power inputs to a transmission as determined by operating parameters and design features of the transmission. These parameters and design features include torque limits for various components in the transmission, torque ratio of the torque converter, the design K factor of the torque converter, gear ratios of the transmission, operating condition of the torque converter clutch, and input power limits for the transmission. A programmable digital computer includes a subroutine that evaluates and establishes torque limits and input speed limits from the design features and operating parameter. The controller sets the limits for each transmission ratio including reverse such that a family of transmission can be coupled to a single engine design without overpowering the transmission should the engine be capable of greater output power than the transmission can accept.

5 Claims, 2 Drawing Sheets

TORQUE AND POWER CONTROL IN A POWERTRAIN

TECHNICAL FIELD

This invention relates to controlling the input power and torque to a multi-speed transmission in a powertrain.

BACKGROUND OF THE INVENTION

Powertrains generally consist of an engine and a transmission. The transmission has a torque converter and a planetary gear arrangement which includes a plurality of torque transmitting mechanisms in the form of both rotating and stationary clutches and band brakes. Each of these elements as well as the shafts in the transmission have a maximum torque capacity which, if exceeded, may be detrimental to the operation of the powertrain. The torque converter has a stall torque point at which the maximum torque capacity is reached. Generally the engine and transmission are matched such that the engine output torque and the converter stall torque are compatible such that the maximum torque limit of the transmission input shaft is not surpassed.

SUMMARY OF THE INVENTION

It is an object of the present invention to provide an improved torque and power control for a powertrain.

In one aspect of the present invention, an electronically controlled powertrain automatically limits the engine torque and power output within the ratings of the transmission. In another aspect of the present invention, the transmission controller contains the available transmission ratings for the transmission family to which it belongs including vocation and transmission range with and without the engagement of the torque converter clutch. In yet another aspect of the present invention, the transmission controller has the ability to provide different ratings for each transmission range, including reverse.

In still another aspect of the present invention, the transmission controller has five determiners for the engine torque limit including the transmission input torque, the transmission output torque, the transmission input power, the transmission turbine torque, and the torque converter slip speed limit. In a further aspect of the present invention, the controller contains values for the torque converter multiplication ratio and the torque converter K factors for each available torque converter model. In yet a further aspect of the present invention, an engine torque versus engine speed map is determined from the design and operating factors for each transmission gear ratio, with and without the engagement of the torque converter clutch, and the controller prohibits powertrain operation outside of the limits set by the map.

DESCRIPTION OF AN EXEMPLARY EMBODIMENT

Figure 1:
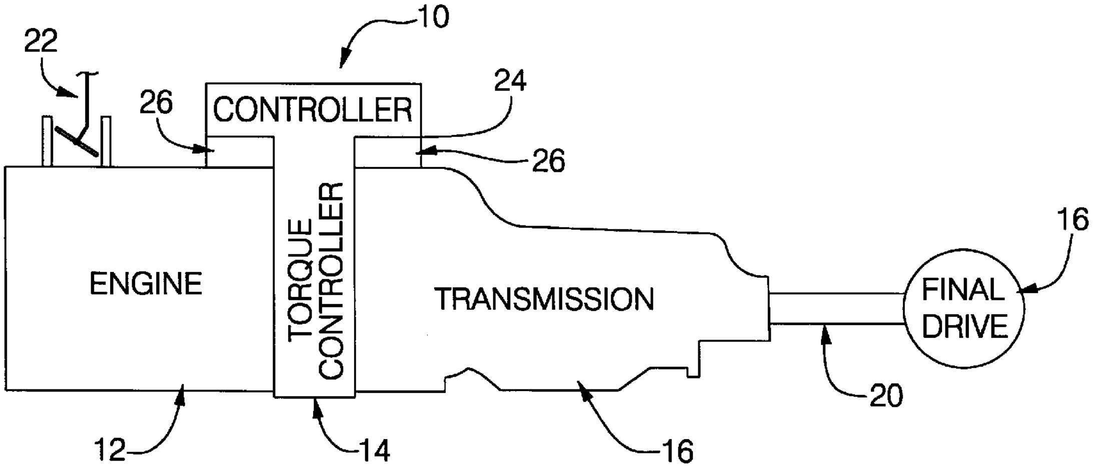
FIG. 1 is a diagrammatic representation of a powertrain incorporating the present invention.

A powertrain 10, shown in FIG. 1, includes an engine 12, a torque converter 14, a multi-speed transmission 16, and a final drive 18. The engine 12 is a conventional internal combustion prime mover. The torque converter 14 is a conventional hydrodynamic mechanism. The transmission 16 is a conventional planetary gear mechanism that may be constructed in accordance with the gearing mechanism described in U.S. Pat. No. 4,070,927 issued Jan. 31, 1978. The transmission 16 preferably includes a conventional torque converter clutch that is engaged during vehicle operation to improve the fuel economy. The design and control of torque converter clutches is well-known to those skilled in the art. The final drive 18 is a conventional differential type gear mechanism, and is connected with the transmission 16 by a shaft 20. The powertrain may also include a conventional transfer gear mechanism, not shown, that would generally be located at the transmission output and divides the power flow between a front differential, not shown, and the final drive 18. The present invention is useful with other transmission arrangements having an electronic control.

The operation of the powertrain is controlled by both operator inputs, such as a throttle control 22, and an electronic control module (ECM) 24. The ECM 24 includes an electronic control unit ECU and a programmable digital computer. These electronic control mechanisms are well-known to those skilled in the art and are used to control many powertrain operations such as, shift sequence, shift timing, engine fuel feed, and various pressures in the transmission, to set forth a few. The digital computer runs a computer program that incorporates a main routine and many subroutines in a well-known manner. One of the subroutines incorporated into the digital computer of the powertrain 10 is represented by the flowchart in FIG. 2. The ECM includes both an engine control module 26 and a transmission control module 28. The ECM may include separate engine and transmission controllers that are in communication through a serial communications link. The subroutine shown in FIG. 2 is included in the digital computer of the transmission controller when the controls are separated.

Figure 2:
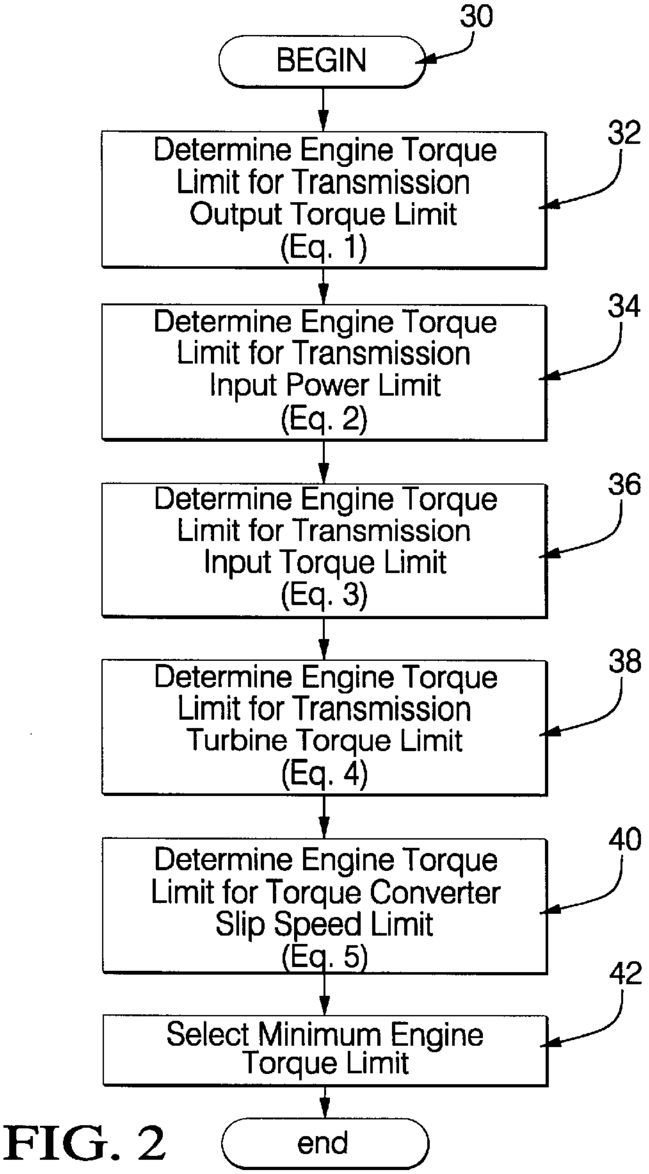
FIG. 2 is a flowchart, in block diagram form, describing the control algorithm for the present invention.
Figure 3:
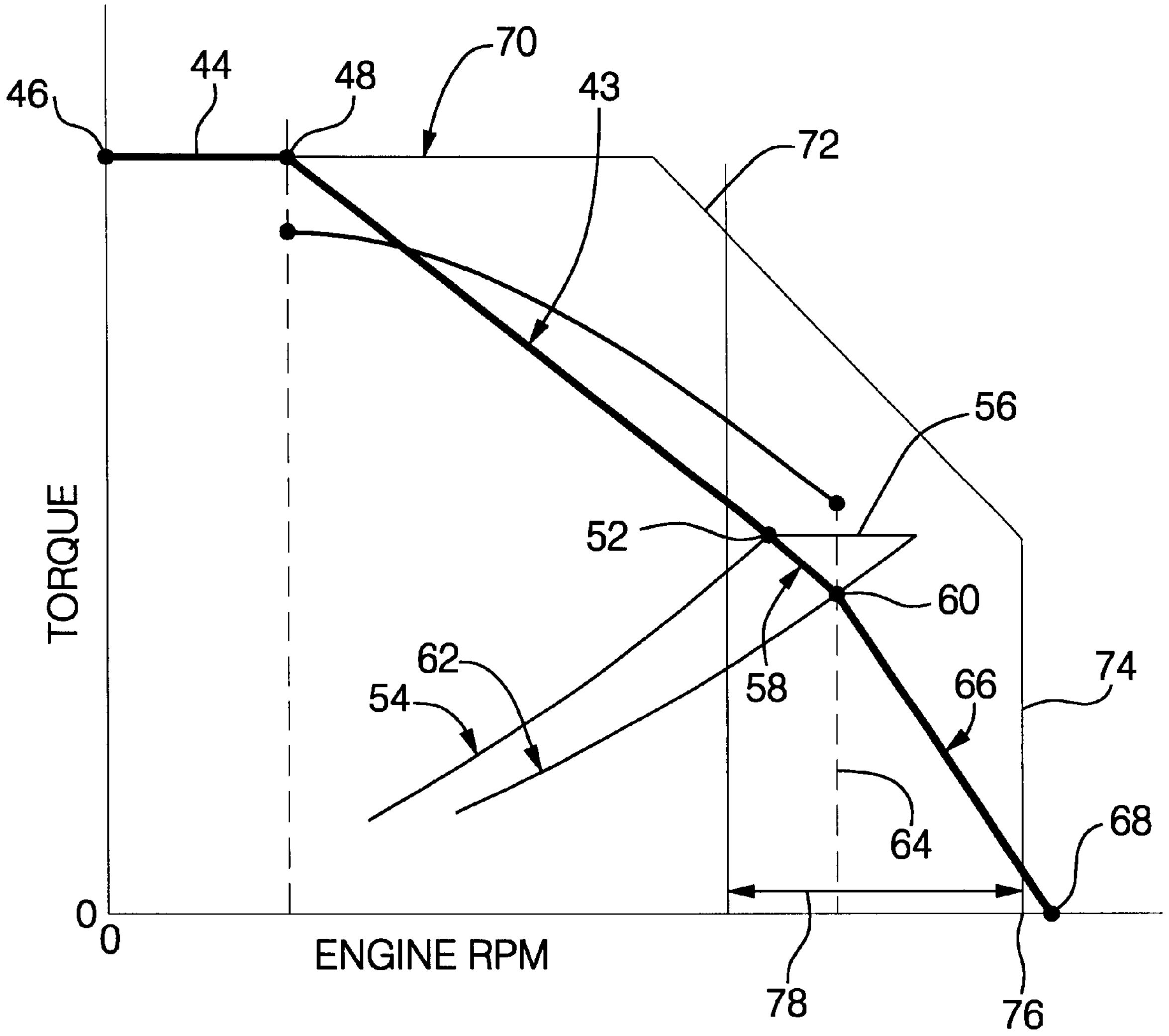
FIG. 3 is an exemplary plot of engine speed versus permitted engine torque generated from the information gathered during operation of the algorithm of FIG. 2.

The algorithm 30, shown in the flowchart of FIG. 2, arbitrates the sources of engine torque and speed limiting by the transmission for purposes of durability and drivability of the powertrain system. Each of the sources of engine torque and speed limiting are evaluated in turn, and the minimum value is selected for final instruction to the engine. The purpose of this logic is to determine the final engine torque limit to communicate to the engine to satisfy the many transmission and total powertrain ratings constraints. The context of the flowchart is the control software subroutine for the transmission controlling such things as valve positions and clutch pressures and monitoring such things as pressure switches and transmission component speeds.

There are five key determinations for engine torque limit: the transmission output torque, the transmission input torque, the transmission input power, the transmission turbine torque, and the torque converter slip speed. The most restrictive rating constraint at any point in time or operation determines the engine torque limit to be communicated from the transmission control module to the engine control module. For each determination, one or several parameters are required. It is important to note that the parameter quantity for torque or power limit may either refer directly to the transmission component in question at the point of evaluation (e.g. the transmission output shaft), or it may refer to any downstream component referenced to the point of evaluation (e.g. vehicle driveline torque limit referenced to the transmission output shaft).

The first determination, step or block 32, evaluates the transmission output torque limit. The parameter transmission output torque limit (design parameter), TQ__Output__limit, is required for this calculation. The engine torque limit is computed from this parameter with inputs for the current states of gear ratio, GR, transfer case ratio/split, TCRS, and torque converter multiplication ratio, TR. Equation 1 shows the engine torque limit due to the transmission output torque limit, TQ__Engine__Limit__OT:

$$\text{TQ\_Engine\_Limit\_OT} = \frac{\text{TQ\_Output\_Limit}}{GR \cdot TCRS \cdot TR}. \tag{1}$$

The second determination, step or block 34, evaluates the transmission input power limit. The engine torque limit is computed from this parameter and the present engine speed, Ne. The parameter, Ku, is a scalar for unit conversion. Equation 2 shows the engine torque limit due to the transmission input power limit, TQ__Engine__Limit__IP:

$$\text{TQ\_Engine\_Limit\_IP} = \frac{\text{P\_Input\_Limits\_Tbl(Gear, } Voc) \cdot Ku}{Ne}. \tag{2}$$

The third determination, block 36, evaluates the transmission input torque limit. A parameter table of transmission input torque limits (stored in the digital computer), TQ__Input__Limits__Tbl, defined as a function of the transmission gear (e.g. $1^{st}$ gear, $2^{nd}$ gear, Reverse), and vocation is required for this calculation. The engine torque limit is computed from this parameter and a table of input torque limits defined as a function of the present gear (e.g. $1^{st}$ gear, $2^{nd}$ gear, Reverse) and vocation. Equation 3 shows the engine torque limit due to the transmission input torque limit, TQ__Engine__Limit__IT:

$$TQ\text{\_\_Engine\_\_Limit\_\_}IT{=}TQ\text{\_\_Input\_\_Limits\_\_Tbl(Gear,Voc)} \tag{3}.$$

The fourth determination, block 38, evaluates the transmission turbine torque limit. The parameter, transmission turbine torque limit (design parameter), $TQ_{13}$ TT__Limit, is required for this calculation. The engine torque limit is computed from this parameter through one of two selectable methods. In the first method, the engine torque limit is computed continuously based on the existing state of the torque converter, the torque converter multiplication ratio, TR. Equation 4a shows the engine torque limit due to the transmission turbine torque limit, TQ__Engine__Limit__TT:

$$\text{TQ\_Engine\_Limit\_TT} = \frac{\text{TQ\_TT\_Limit}}{TR}. \tag{4 a}$$

In the second method, the engine torque limit is computed by first determining the characteristic engine speed at which the turbine torque limit is reached under stall conditions. This is accomplished by first determining the engine torque at which the turbine torque limit is reached under stall conditions. This is defined as a parameter table for transmission turbine torque, TQ__Turbine__Limits__Tbl, defined as a function of the transmission gear (e.g. $1^{st}$ gear, $2^{nd}$ gear, Reverse and vocation), and the torque converter multiplication ratio at stall, TR__Stall. Equation 4b shows the engine torque at stall conditions where the turbine torque limit is reached, TQ__Engine__Stall__TT:

$$\text{TQ\_Engine\_Stall\_TT} = \frac{\text{TQ\_Turbine\_Limits\_Tbl(Gear, } Voc)}{\text{TR\_Stall}}. \tag{4 b}$$

Next the engine speed is determined. The torque converter pump K-factor at stall, Kp__Stall, is required. Equation 4c shows the engine speed at stall conditions where the turbine torque limit is reached, Ne__Stall__TT:

$$Ne\text{\_\_Stall\_\_}TT{=}Kp\text{\_\_Stall}\cdot\sqrt{\text{TQ}_{\text{\_Engine\_\_Stall\_}TT}} \tag{4c}.$$

Finally, the present engine speed, Ne, is compared to Ne__Stall__TT. The engine torque limit for the turbine torque limit, TQ__Engine__Limit__TT, is based as shown in Equation 4d:

$$\text{Torque\_Slope\_Hi} = \frac{\text{TQ\_Engine\_Limit\_FLGS} - \text{TQ\_Engine\_Stall\_TT}}{\text{Ne\_FLGS} - \text{Ne\_Stall\_TT}} \tag{4 d}$$

$$\text{Torque\_Slope\_Lo} = \frac{\text{TQ\_Engine\_Limit\_IT} - \text{TQ\_Engine\_Stall\_TT}}{\text{Ne\_Peak\_Torque} - \text{Ne\_Stall\_TT}}$$

$$\text{TQ\_Engine\_Limit\_TT} = \text{TQ\_Engine\_Stall\_TT} + (Ne - \text{Ne\_Stall\_TT}) \cdot \begin{Bmatrix} \text{Ne\_FLGS} > Ne > \text{Ne\_Stall\_TT} & \text{Torque\_Slope\_Hi} \\ Ne = \text{Ne\_Stall\_TT} & 0 \\ \text{Ne\_Peak\_Torque} < Ne < \text{Ne\_Stall\_TT} & \text{Torque\_Slope\_Lo} \end{Bmatrix}.$$

The fifth determination, step or block 40, evaluates the transmission torque converter slip speed limit at full load governed speed of the engine. Two rating parameters are required at engine full load governed speed: the engine speed itself, Ne__FLGS (obtained from the engine controller), and the torque converter pump K-factor at a 0.8 converter speed ratio, Kp__0.8 Kp__at__SR__Limit. The 0.8 speed ratio value is an example. This value can be varied for the particular powertrain being controlled. Equation 5a describes the engine torque limit at full load governed speed, TQ__Engine__Limit__FLGS:

$$\text{TQ\_Engine\_Limit\_FLGS} = \left(\frac{\text{Ne\_FLGS}}{\text{Kp\_at\_SR\_Limit}}\right)^2. \tag{5 a}$$

Then, the engine torque limit for torque converter slip speed, TQ__Engine__Limit__TC, is based as shown in Equation 5b on calibration set engine torque lines, Torque__Slope__TC__Hi and Torque__Slope__TC__Lo as follows:

$$\text{Torque\_Slope\_TC\_Hi} = -\frac{\text{TQ\_Engine\_Limit\_FLGS}}{\text{Ne\_High\_Speed\_Delta}} \tag{5 b}$$

$$\text{TQ\_Engine\_Limit\_TC} = \text{TQ\_Engine\_Limit\_FLGS} + (Ne - \text{Ne\_FLGS}) \cdot \begin{Bmatrix} Ne > \text{Ne\_FLGS} & \text{Torque\_Slope\_TC\_Hi} \\ Ne = \text{Ne\_FLGS} & 0 \\ Ne < \text{Ne\_FLGS} & \text{Torque\_Slope\_TC\_Lo} \end{Bmatrix}.$$

For Ne<Ne__FLGS, TQ__Engine__Limit__TC=∞ (infinity)

Next, the minimum of the five engine torque limits is selected, step or block 42. Once the minimum engine torque limit is selected, this engine torque limit is compared with other sources of transmission engine torque and speed limiting and control, such as upshift inertia phase torque limiting or speed limiting during garage shift engagement, and the final arbitration of engine control is completed. The final result is then broadcast to the engine over serial communication link.

When the torque converter clutch is applied, the torque converter provides no torque multiplication; finctionally, it is just a pass-through device. For these cases, the above numbered engine torque limits are affected as follows:

(1) TR is set to 1.0 (no torque converter multiplication) and the limit is calculated;

(2) no change to calculation based on torque converter clutch operation;

(3) no change to calculation based on torque converter clutch operation;

(4) limit not used during applied torque converter clutch operation;

(5) limit not used during applied torque converter clutch operation.

The plot of engine speed versus torque curve 43 is derived from the values established in part with information derived from the foregoing equations. The line 44 is determined by transmission input torque limit established by equation 3. The end points 46 and 48 of the line 44 are determined by the zero engine speed point and a peak engine torque speed, respectively. The curve 43 represents the limited gross engine torque curve with the end points 46 and 68. The point 52 is determined by the equations 4b–4d. The point 52 is also the intersection of a curve 54 and a line 56. The curve 54 is a plot of the torque into the torque converter represented by $(Ne/Kp\_Stall)^2$ and the line 56 is a representation of the transmission turbine torque rating in effect divided by the torque converter stall ratio. The line 58 is determined by the points 52 and 60. The point 60 is determined by the equations 5a and 5b. This point 60 is also the intersection of a curve 62 and a line 64. The curve 62 is a representation of torque vs. speed as determined by the (engine speed divided by the torque converter K factor at a 0.80 speed ratio)$^2$. The line 64 is determined by the governed engine rpm at full load. The line 66 is determined by the equation 5b. The end point 68 is determined by a point at zero torque and the governed engine rpm at full load plus 300 rpm. As previously mentioned, the value 0.8 is by way of example only as is the speed value of 300 rpm. These values will be dependant on the particular system in use.

The ECM 24 is effective to maintain the operation of the powertrain 10 within the envelope defined by the curve 43. An outer envelope, curve 70, is defined by the transmission gross input torque rating (equation 3), a line 72 of constant transmission gross input power rating in effect (equation 2) and a line 74 established by the outer speed point 76 of a transmission input governed speed band 78. The envelope defined by the curve 70 is the only envelope in effect when the torque converter clutch is engaged.

By utilizing the above described algorithmn, the transmission input power and torque is limited because the engine output is restricted to remain within the transmission ratings. The transmission control module 28 is programmed to include all of the transmission ratings for a particular transmission family. These ratings are dependent upon the vocation (customer parameter) and transmission range with and without the torque converter clutch engaged. This provides the transmission with the capability to utilize different ratings for each transmission range. The transmission control module 28 is also provided with the stall K factor and the 0.80 speed ratio K factor for each torque converter within the transmission family.

Preferably the transmission is shipped to the vehicle manufacturer with the vocation established at the default rating which will set the transmission ratings. The manufacturer can change the vocation setting if desired. With the transmission installed in a powertrain, the transmission in gear and the output shaft stopped, the transmission reads the engine torque over the serial communications link and combines that with the engine speed to determine the torque converter model in use. The transmission control module 28 and the engine module 26 will communicate such that the envelope represented by the curve 43 will be established. This provides the controller with the required input data such as current transmission rating, torque converter installed, current range, engine peak torque speed, engine full load governed speed, and the torque converter clutch status so that the degree of engine output limiting for each range, with or without the torque converter clutch engaged, can be determined. This permits a complete line of transmission family to be used with a single engine without the engine being derated by the manufacturer which might be overlooked in some instances to the detriment of the powertrain.

In the case where the engine does not receive a valid requested torque message from the transmission (don't care/take no action is valid), the engine operates in a derated mode that is equal to or lower than the lowest requested torque prior to the message becoming invalid.

What is claimed is:

1. A method of controlling input power and torque to a transmission in a powertrain having an engine, said method comprising the steps of:

determining a first engine torque limit in accordance with a given transmission output torque limit;

determining a second engine torque limit in accordance with a given transmission input power limit;

determining a third engine torque limit in accordance with a given transmission input torque limit;

determining a fourth engine torque limit in accordance with a given transmission turbine shaft torque limit;

determining a fifth engine torque limit in accordance with a given torque converter slip speed limit; and selecting a minimum of said first through fifth engine torque limits dependent on a given operating speed.

2. The method defined in claim 1 further comprising:

said third engine torque limit determination and said second torque limit determination being employed to define an operating envelope of engine speed and engine torque within which the powertrain is controlled when a torque converter clutch in the transmission is engaged.

3. The method defined in claim 1 further comprising:

said third engine torque determination, said fourth engine torque determination, and said fifth engine torque determination being employed to define an operating envelope of engine speed and engine torque within which the engine output is controlled when a torque converter clutch in the transmission is not engaged.

4. A method of controlling the input power to a transmission in a powertrain having an engine with a power output comprised of engine speed and engine torque, said method comprising the steps of:

determining a first engine torque limit in accordance with a given transmission input torque limit;

determining a second engine torque limit in accordance with a given transmission turbine torque limit;

determining a third engine torque limit in accordance with a given limit of torque converter slip;

controlling the output of the engine within an envelope of engine speed and engine torque defined by first line exhibiting a constant engine torque equal to the first engine torque limit determination and extending from zero engine speed, a second line extending from an engine peak torque point on said first line to a first point established by said second engine torque limit determination, and a third line extending from said first point to a second point established by said third engine torque limit determination.

5. The method defined in claim 4 fuirther comprising the step of:

determining a fourth engine torque limit in accordance with a transmission input power limit;

controlling the output of the engine within a second and larger envelope of engine speed and engine torque defined by said first line and a fourth line established by said fourth engine torque limit determination intersecting said first line and exhibiting decreasing engine torque with increasing engine speed.

* * * * *